Jan. 5, 1943.   S. T. MORELAND   2,307,289
MOLD CHARGING MECHANISM
Filed Feb. 14, 1939   2 Sheets-Sheet 1

INVENTOR.
S. T. MORELAND.
BY Rule & Hoge
ATTORNEYS.

Jan. 5, 1943.  S. T. MORELAND  2,307,289
MOLD CHARGING MECHANISM
Filed Feb. 14, 1939  2 Sheets-Sheet 2

INVENTOR.
S. T. MORELAND.
BY Rule & Hoge
ATTORNEYS.

Patented Jan. 5, 1943

2,307,289

UNITED STATES PATENT OFFICE 2,307,289

MOLD CHARGING MECHANISM

Stephen T. Moreland, Toledo, Ohio, assignor to Owens-Illinois Glass Company, a corporation of Ohio Application February 14, 1939, Serial No. 256,318

3 Claims. (Cl. 18—30)

The present invention relates to feeding mechanism for automatically transferring measured charges of granular or powdered moldable material from a supply body thereof contained in a hopper or other receptacle, to the individual molds of a molding machine.

The mechanism comprising the present invention is primarily adapted for use in connection with molding machines of the rotary type wherein a plurality of molding units or dies are moved progressively and continuously through a predetermined cycle of operations, the molding material being fed to the dies at one point in the cycle.

One form of such a molding machine consists of a rotary carriage disposed within a stationary casing and having mounted thereon an annular series of mold or die heads, each including male and female die elements. Each set of die elements is actuated by a piston motor including a vertically extending cylinder, the piston of which is operatively connected to the movable die element. The cylinders are arranged in spaced relationship around the carriage near the peripheral regions thereof and in the charging region of the machine they become exposed through an opening provided in the casing of the machine. A feeding mechanism is attached to the casing of the molding machine and is provided with a cam member or finger that cooperates successively with the individual cylinders of an annular rotatable series of cylinders provided for the purpose of actuating the forming dies in such a manner that each cylinder in passing engages the finger and actuates the feeding mechanisms and causes a charge of moldable material to be delivered to one of the forming dies. By such an arrangement, since the walls of the annular series of moving cylinders operate as cams to actuate the feeding mechanism, the apparatus is designed for use only in connection with molding machines employing a full set of mold units or dies.

However, in molding machine operation under certain conditions of manufacture, it may be desirable from economic considerations to employ a half set of mold units or even less and operate the molding machine at reduced capacity. Indeed, under certain conditions it may be desired to employ a single mold unit as for example, where the machine is being employed experimentally.

The present invention is designed as an improvement over feeding mechanisms of the type just described in that it will permit limited actuation thereof for the purpose of charging the dies of only those molds employed in operating the molding machine under any given conditions of manufacture.

This being the principal object of the invention, it is another object thereof to provide such an apparatus which will prevent the feeding apparatus from being actuated when certain selected mold units are encountered even though only one mold unit is in operation on the machine.

Other objects of the invention, not at this time enumerated, will become apparent hereinafter.

Figure 1:
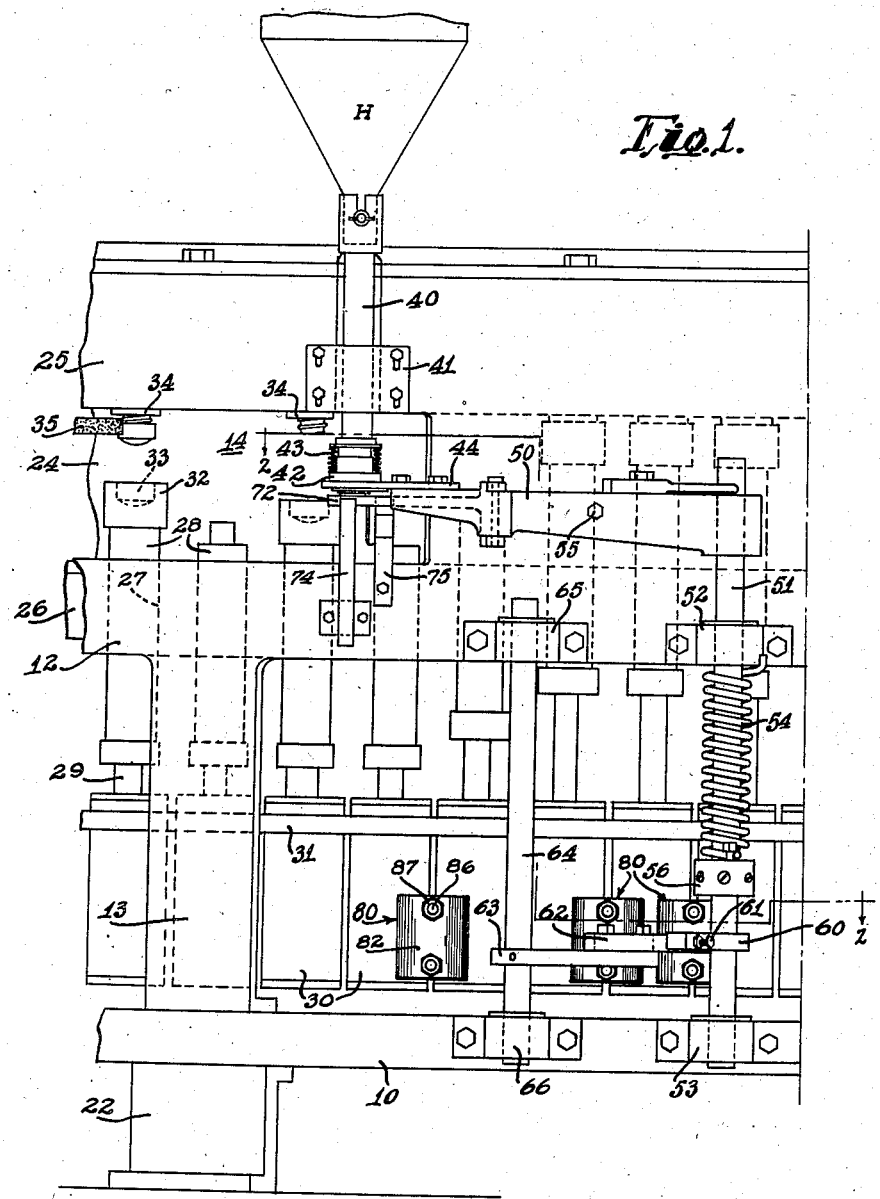
Fig. 1 is a fragmentary side elevational view of a molding machine, showing the improved feeding device attached thereto.

Referring now to Fig. 1, a portion of a molding machine in the vicinity of the charging zone thereof is shown and involves in its general organization a base member 10 in the form of a ring which is supported upon legs 22. A casing 12, supported by means of webs 13 from the base member 10, is provided with a slot or opening 14 therein at the front of the machine through which the various molds are supplied with moldable material and through which the formed articles are removed from the machine. Rotatably supported within the casing 12 adjacent the top thereof is a head 24 or drum having relatively thick continuous upper and lower radial flanges 25 and 26 respectively. The lower flange 26 is provided with a series of vertical bores 27 in which are supported for vertical sliding movement a plurality of cylindrical members 28 which are supported at their lower ends on piston rods 29 associated with an annular series of hydraulic cylinders 30 which are supported in the peripheral region of a rotary table 31. A mold 32 or die element having an open cavity 33 is supported on the upper end of each of the cylindrical members 28. The die elements are designed for cooperation with a series of mandrels 34 or die elements which are aligned therewith and which are supported about the periphery of the upper flange 25. An ejecting mechanism 35 which is common to all of the mandrels 34 is provided for stripping the formed articles therefrom in the vicinity of the charging zone.

The moldable material is fed to the die elements 32 at the charging zone through the opening 14 in the casing 12 and immediately thereafter the charged die elements are elevated by the hydraulic cylinders 30 into forming cooperation with the mandrels 34. The die elements proceed through a forming cycle during which they are heated and the material therein is cured and, as they again approach the opening 14 they are lowered and the formed articles removed from the mandrels 34 by means of the ejecting mechanism 35. The operation is continuous.

The moldable material is contained in a charging hopper H which communicates with a vertical chute 40 which is adjustably secured by means of a plate 41 to the casing 12 at the forward side of the machine. The lower end of the chute 40 terminates in the charging zone in the vicinity of the revolving molds or dies 32. A sealing sleeve 42 is telescopically mounted on the lower end of the chute 40 and is held by means of springs 43 in yielding engagement with the charging plate 44 which is slidable therebeneath. The charging plate 44 is formed with a charging opening 45 (Fig. 2) therein which is preferably slightly smaller in diameter than the diameter of the die cavities 33 and which is movable with the charging plate 44 from a position of register with the chute 40 to a position of register with the individual dies 32.

The charging plate 44 is secured to the free end of a charging arm 50 (see also Fig. 2) for longitudinal adjustment thereon. The other end of the arm 50 is keyed for vertical adjustment to a vertically extending rock shaft 51 which is mounted in bearings 52 and 53 secured to the casing 12 and base member 10 respectively. A coil spring 54 surrounding the rock shaft 51 has one end thereof secured to an angularly adjustable collar 56 and applies a torque to the rock shaft 51 in such a manner as to urge the charging arm inwardly toward the molding machine so that the charging plate 44 normally assumes a charging relation with respect to the individual die elements 32. Angular adjustment of the collar 56 on the shaft 51 permits the tension of the spring 54 to be varied. The innermost position of the charging plate 44 is controlled by means of a set screw 55 extending through the arm 50 and adapted to bear against the casing 12 to limit the inward swinging movement of the arm. It will be seen that by adjusting the position of the charging plate 44 on the charging arm 50 and by manipulating the set screw 55, the opening 45 in the plate 44 may accurately be aligned with the die cavities 33 of the various die elements 32 when the charging plate 44 is in its innermost or charging position.

Figure 2:
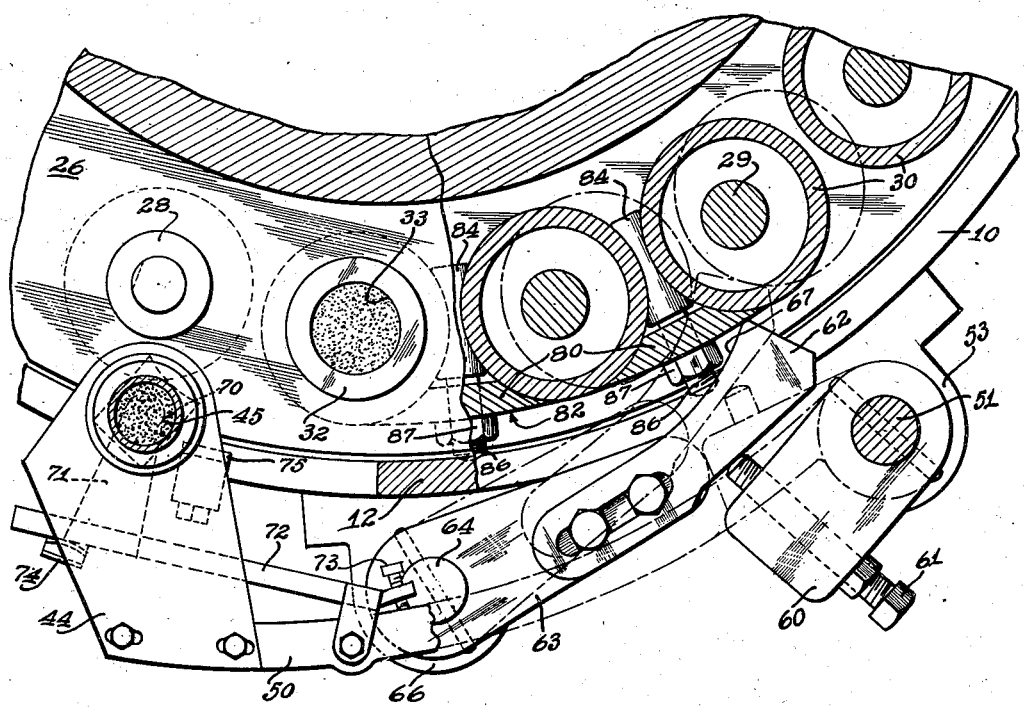
Fig. 2 is a sectional view taken substantially along the line 2—2 of Fig. 1.
Figure 3:
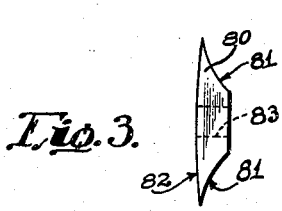
Figs. 3 and 4 are respectively an end view and face view of one of the blocks for preventing the charging mechanism from delivering mold charges to selected molds.
Figure 4:
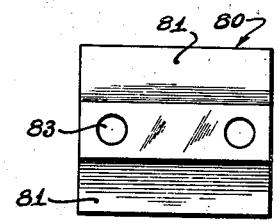
Figure 5:
Figs. 5 and 6 are respectively a side view and end view of a retaining member for clamping in position the block shown in Figs. 3 and 4.
Figure 6:

Still referring to Figs. 1 and 2, wherein the actuating mechanism for the rock shaft 51 is illustrated, a rock arm 60 is secured to the rock shaft 51 adjacent the bottom thereof and is provided with a set screw 61 adapted to bear against a cam member or follower 62 which is adjustably secured to the free end of a rock arm 63. The other end of the rock arm 63 is secured to a vertically extending rock shaft 64 which is mounted in bearings 65 and 66 secured to the casing 12 and base member 10 respectively.

The coil spring 54, acting through the shaft 51, normally urges the cam member or follower 62 inwardly and causes the same to be interposed in the path of movement of the revolving series of hydraulic cylinders so that each cylinder as it passes, cams the follower outwardly. The inner side of the cam member 62 is curved as at 67 for engagement with the oncoming cylinders 30, while the outer side thereof is substantially straight and is designed for engagement with the set screw 61.

In the outermost position of the cam member 62 as shown in full lines in Fig. 2, the rock arm 60 is held outwardly away from the molding machine and the charging arm 50 and plate 44 assume a position wherein the charging opening 45 is in register with the lower end of the chute 40.

In the innermost position of the cam member 62 as shown in dotted lines in Fig. 2, the cam surface 67 of the cam member 62 is in engagement with the side of one of the cylinders 30 and the rock arm 60 assumes its innermost position with the charging arm 50 and plate 44 assuming a position wherein the charging opening 45 is in register with the cavity 33 of one of the die elements 32.

The center-to-center distance between adjacent cylinders 30 being equal to the center-to-center distance between adjacent die elements 32, actuation of the charging arm 50 in timed relation to the arrival of the die elements at the charging zone will be attained regardless of the rate of speed at which the molding machine is driven and regardless of the fact that the cam member 62 at the precise moment of charging of one of the die elements 32 cooperates with a cylinder 30 which is three times removed from the actuating cylinder for the die being charged.

In order to effectively close the bottom of the charging opening 45 in the charging plate 44 when the opening is in register with the chute 40, a closure plate 70 or shutter plate shown in dotted lines in Fig. 2 is mounted on one end of an arm 71 which is secured adjacent the free end of a shutter arm 72 which is in turn pivoted to the charging arm 50 medially thereof for relative swinging movement with respect thereto. The shutter plate 70 is adapted to normally underlie the opening in the plate 44 when the latter is retracted to its position of registry with the chute 40, and is movable inwardly with the charging plate 44 as the latter moves inwardly to charge the die elements 32. Accordingly, when the charging arm 50 is in its outermost position, a set screw 73 limits the inward swinging movement of the shutter arm 72 and permits the shutter plate 70 to be aligned with the charging opening 45. While in this position, a leaf spring 74 secured to the casing 12, bears against the shutter arm 72 and normally urges the same inwardly to its position of registry with the charging opening 45.

An abutment 75 or limit stop secured to the casing 12 projects upwardly into the path of movement of the shutter arm 72. Thus when the charging arm 50 is swung inwardly and the charging plate 44 is moved inwardly to its charging position with the shutter plate 70 beneath the charging opening 45, the abutment 75 terminates the inward movement of the shutter plate 70 when the forward edge thereof overlies the edge of the particular die cavity 33 which is about to receive a charge of moldable material from the charging plate 44. The charging arm 50 however continues its inward movement until the charging cavity 45 is in registry with the die cavity 33 and thus the moldable material contained in the charging cavity, no longer being supported on the shutter plate 70, falls by gravity into the cavity 33 of the mold 32.

By virtue of the fact that the sealing sleeve 42 is yieldingly pressed against the charging plate 44 which slides therebeneath, and by virtue of the fact that the opening in the charging plate does not move over the forward edge of the shutter plate 70 until after it has moved over the edge of the mold cavity 33, loss of material due to spilling thereof is reduced to a minimum. Furthermore, since the material contained in the hopper H is completely sealed from the atmosphere until such a time as the individual charges are released and discharged into the mold cavities, dusting of the material into the atmosphere is reduced to a minimum.

Under certain conditions of manufacture, as for example, where the size of a particular order for molded articles is small, it may be desired to run the molding machine with a lesser number of mold units than the full quota thereof in operation. Or in experimental use it may be desired to run the molding machine with only one mold unit in operation. Toward these ends, the present invention contemplates means for rendering the charging mechanism just described inoperative when a predetermined inoperative mold unit is encountered.

Accordingly, in Figs. 3 to 6 inclusive, there is disclosed a charge preventing assembly including a generally trapezohedral block 80 (Fig. 3) but having opposed curved sides 81 of a radius of curvature equal to the radius of curvature of the cylinders 30, and a curved side 82 of a radius of curvature equal to the outside tangent circle surrounding the series of cylinders. A pair of bolt holes 83 pass through the block 80 perpendicular to the curved side 82.

The charge preventing assembly also includes a pair of members 84 (Fig. 5) formed from cylindrical stock and having a portion which is generally in the form of a hyperbola of revolution having curved sides 85 of a radii of curvature equal to the radii of curvature of the cylinders 30 and having formed thereon threaded shanks 86.

It has previously been pointed out that at the precise moment of charging of one of the die elements 32, the cam member 62 cooperates with a cylinder 30 which is three times removed from the actuating cylinder for the die being charged. Thus, when it is desired to prevent the feeding mechanism from delivering a charge of moldable material to any particular mold unit arriving at the charging zone, it is merely necessary to align the members 84 over the space existing between the cylinders three times and two times removed from the actuating cylinder for that particular mold head and to slide the same downwardly between the two cylinders to the level of the cam member 62. The curved sides 85 of the members 84 will fit snugly against the walls of the cylinders. The members 84 are then assembled on the block 80 with the shanks 86 passing through the bolt holes 83 and a pair of nuts 87 is threaded on the shanks 86 as shown in Fig. 2. The assembly 80, 84, 87, is thus securely locked in position.

Because of the fact that the radius of curvature of the side 82 of the block 80 is equal to the radius of curvature of the outside tangent circle surrounding the cylinders 30, the follower 62 will be prevented from entering between the adjacent cylinders but instead, will find a smooth path across the surface of the side 82 and charging of the mold unit at the charging zone will be prevented. Obviously, any desired number of the assemblies 80, 84, 87 may be employed and their location between the various adjacent cylinders 30 is a matter of choice.

Modifications may be resorted to within the spirit and scope of the appended claims.

I claim:

1. A molding machine comprising a rotatable carriage, an annular series of molding units mounted to rotate with the carriage and comprising an annular series of dies, an annular series of piston motors for actuating the dies, said motors mounted to rotate with the carriage and having vertical cylindrical casings, a feeding mechanism mounted separately from the carriage for supplying charges of moldable material to the dies, means for moving the feeding mechanism periodically to a charge feeding position, a cam follower mounted separately from the carriage, said follower being positioned and arranged to be moved by said means inwardly between each two adjacent casings in succession as the carriage rotates, a block shaped to fit between any two adjacent casings and bridge the space therebetween, and a clamping device for detachably clamping the block in position between adjacent casings in the path of the cam follower, said block having a curved surface substantially tangent to the surfaces of the adjoining casings when the block is secured in said position, the block when secured in said position being operative to restrain the cam follower and prevent an operation of the feeding mechanism.

2. A molding machine including a rotating carriage and an annular series of mold units rotating therewith and thereby moved through a charging zone, each unit comprising a movable die, a relatively stationary die, a cylinder and a piston therein connected to the movable die for moving the latter, feeding mechanism including a charging member movable to and from a die charging position for supplying a charge of moldable material to the movable die of each unit when the latter is within the charging zone, a cam follower operatively connected to said charging member, said cam follower positioned in the path of movement of the cylindrical surfaces of said cylinders and cam actuated thereby for operating said charging member, and a block detachably secured to a pair of adjacent cylinders in position to restrain the cam follower and thereby prevent an operation of the charging member, said block having an outside curved surface having substantially the radius of curvature of the outside tangent circle surrounding said cylinders and said curved surface being substantially tangent to the cylindrical surfaces of the said adjacent cylinders, said block having inner surfaces in contact with and conforming to the curvature of said adjacent cylinders.

3. A molding machine comprising a rotatable carriage, an annular series of molding units mounted to rotate with the carriage and comprising an annular series of dies, an annular series of piston motors for actuating the dies, said motors mounted to rotate with the carriage and having vertical cylindrical casings, a feeding mechanism mounted separately from the carriage for supplying charges of moldable material to the dies, means for moving the feeding mechanism periodically to a charge feeding position, a cam follower mounted separately from the carriage, said follower being positioned and arranged to be moved by said means inwardly between each two adjacent casings in succession as the carriage rotates, a block shaped to fit between any two adjacent casings and bridge the space therebetween, and a clamping device for detachably clamping the block in position between adjacent casings in the path of the cam follower, said block having a curved surface substantially tangent to the surfaces of the adjoining casings when the block is secured in said position, said clamping device comprising an elongated body fitted between said adjacent casings and held thereby against both lengthwise and rotative movement, a screw-threaded shank formed on said body, and a nut by which the clamping device is secured to said block, the block when secured in said position being operative to restrain the cam follower and prevent an operation of the feeding mechanism.

STEPHEN T. MORELAND.